W. PARKER.
TRAP.
APPLICATION FILED AUG. 17, 1910.
982,387.
Patented Jan. 24, 1911.
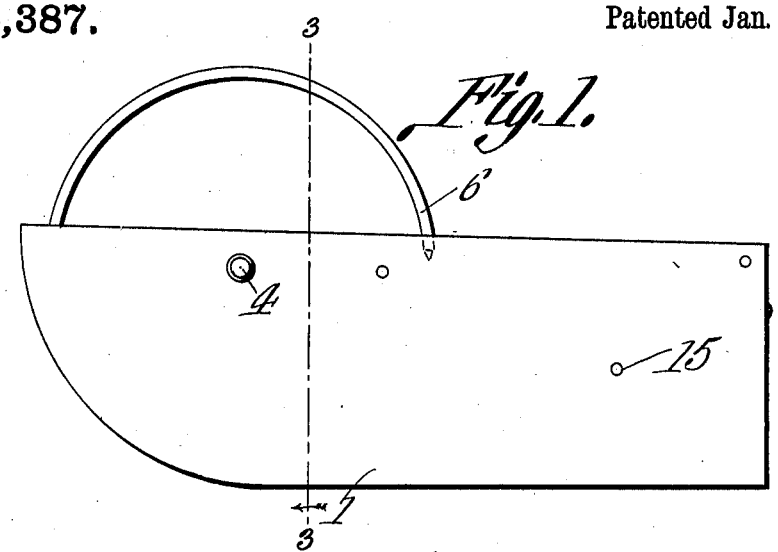
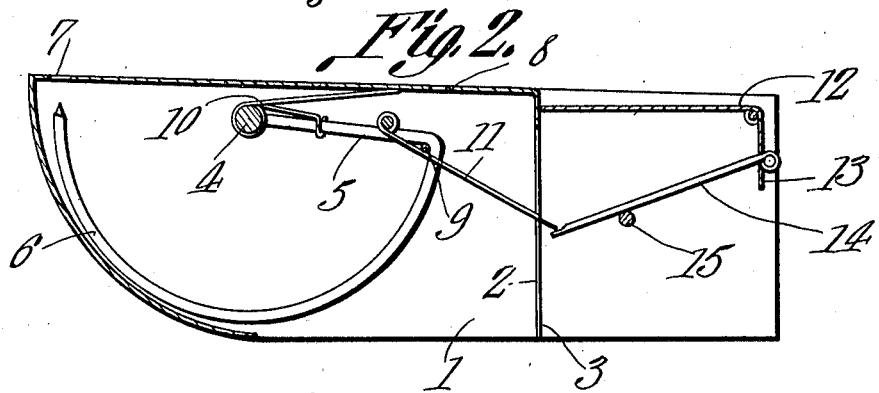
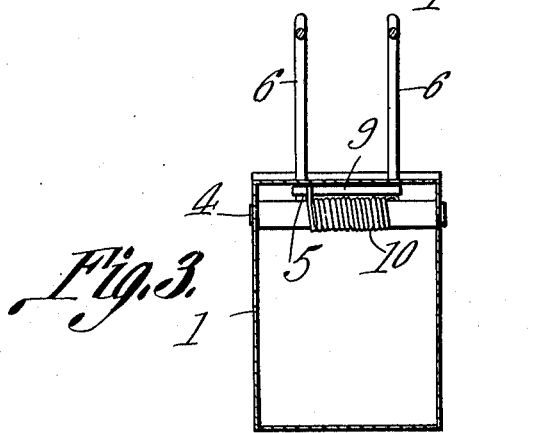
Witnesses
William Parker
Inventor
by C. A. Snow & Co.
Attorneys

UNITED STATES PATENT OFFICE.

WILLIAM PARKER, OF TOOELE, UTAH.

TRAP.

982,387.  Specification of Letters Patent.  Patented Jan. 24, 1911.

Application filed August 17, 1910. Serial No. 577,555.

*To all whom it may concern:*

Be it known that I, WILLIAM PARKER, a citizen of the United States, residing at Tooele city, in the county of Tooele and State of Utah, have invented a new and useful Trap, of which the following is a specification.

This invention has relation to traps especially adapted to be used for capturing gophers and the like and it consists in the novel construction and arrangement of its parts as hereinafter shown, described and claimed.

The object of the invention is to provide a trap of simple structure and which may be used at or below the surface of the ground and which in its structure embraces a trigger composed of two parts, the object of which is to permit the structure to be assembled with a trip approximately at the same horizontal plane as the platform upon which the animal is impaled when the trap is sprung.

With this object in view the trap includes a casing in which curved impaling spears are pivotally mounted and are adapted to be sprung by a spring when the trigger members are operated. A trip is attached to one of the trigger members and is adapted to release the said trigger member, which in turn will release the impaling spears when an animal encounters the said trip.

In the accompanying drawings,—Figure 1 is a side elevation of the trap. Fig. 2 is a longitudinal sectional view of the same showing the parts set. Fig. 3 is a transverse sectional view of the trap cut on the line 3—3 of Fig. 1.

The trap consists of a casing 1 which is provided at a point between its ends with a partition 2 having a vertically disposed slot 3. A shaft 4 is journaled in the casing 1 and radially disposed arms 5 are mounted upon the said shaft and the said arms at their outer ends are continued into impaling spears 6. The said spears 6 are arcuate in configuration and are adapted to pass up through perforations 7 provided in the top of the casing 1 and also enter perforations 8 provided in the top of the casing 1 when the trap is sprung. The outer end portions of the arms 5 are connected by a cross bar 9. A spring 10 bears at one end against the top of the casing 1 and is coiled about the intermediate portion of the shaft 4 and the other end of the said spring is fixed to one of the arms 5 in the manner as indicated in Fig. 2 of the drawing.

A trigger member 11 is pivoted under the intermediate portion of the casing 1 and is of such length that when it is in an approximately vertical position its lower end will be above the plane of the lower edges or lower side of the casing 1. A trip 12 is pivotally mounted in the upper portion of the casing 1 and is provided at one end with a downwardly disposed flange 13. A trigger member 14 passes through an opening provided in the flange 13 and when the trap is set it is adapted to rest upon a cross rod 15 which extends from one side to the other of the casing 1.

In operation the trap may be set above or at the surface of the ground or immediately below the same in any desired manner. Prior to positioning the trap it is set as follows. The impaling spears 6 are swung back together with the arms 5 against the tension of the spring 10 until the pointed end of said spears are completely housed within the casing 1. The trigger member 11 is then permitted to swing down between the said spears and is brought in contact with the cross bar 9 and the free end of the said trigger member is swung up through the slot 3 in the partition 2. The trip 12 is then swung down until its upper portion is approximately parallel with the upper side of the casing 1 and the trigger member 14 is slipped longitudinally through the flange 13 until its free end portion rests over the cross rod 15 and its extremity is located under the free end portion of the trip member 11. Thus the trip members 11 and 14 are held in position indirectly through the tension of the spring 10. When an animal approaches the trap and encounters the trip 12, the same is swung so that the trigger member 14 is moved longitudinally and its free end·portion is removed from beneath the free end of the trigger member 11. The tension of the spring 10 then comes into play and swings the trigger member 11 in a downward direction. The said member 11 being of such length that it does not encounter the lower side of the casing 1 no obstruction is presented to free movement of the impaling spears 6. The said spears move in an arc about the axis of the shaft 4 as a center and the pointed ends thereof pass up through the perforations 7 in the top of the casing 1 and then approach and enter or attempt to enter the perforations 8 in the top of the said casing. As the pointed ends of the spears 6 begin to approach the top of the casing 1 during the movement above described they encounter the animal which has actuated the trip 12 and impale the same upon the top of the casing. By reason of the fact that the trigger mechanism is composed of two members it is possible to so position the members that they may describe comparatively short swing and at the same time the impaling spears of the trap will have maximum extent of movement or swing. Again, by reason of the fact that the trigger members are in duplicate the members may be made comparatively short and thus the trap may be conveniently used below the surface of the ground for capturing gophers and similar animals, and by reason of the comparative short lengths of the said trigger members the possibility of the said members encountering obstructions and thereby interfering with the proper operation of the trap is reduced to a minimum.

Having described what I claim as new and desire to secure by Letters Patent is:—

1. A trap comprising a casing having at a point intermediate its ends a partition provided with a vertically disposed slot, spring-actuated impaling members pivotally mounted within the casing, a trigger member pivoted within the casing and adapted to engage the spears to hold the same against movement, and adapted to enter the slot in the said partition, a trip pivotally mounted within the casing, a cross bar located within the casing at one side of the said partition, a trigger member slidably attached to the trip and adapted to rest upon said cross bar and adapted when the trap is set to project under the free end portion of the first said trigger member and restrain the same against movement.

2. A trap comprising a casing, said casing having at a point between its ends a vertically disposed partition provided in its lower edge with an elongated slot, a shaft journaled in the casing, radially disposed arms fixed to the shaft, the outer portions of said arms being continued into arcuate impaling spears, a cross bar connecting the outer portions of the arms together, a spring coiled about the shaft and bearing at one end against the casing and at its other end against one of the said arms and being under tension with a tendency to project the impaling spears about the upper surface of the casing, a trigger member pivoted within the casing and adapted when the trap is set to lie under the cross bar between the said arms and to enter the slot in the said partition, a trip pivoted in the casing and having a downwardly disposed end portion, a trigger member slidably mounted in the downwardly disposed end portion of the said trip, a cross rod located in the casing, the last said trigger member adapted to rest upon the said cross rod and adapted to project under the free end of the first said trigger member when the trap is set and to restrain the first said trigger member against movement.

In testimony that I claim the foregoing as my own, I have hereto affixed my signature in the presence of two witnesses.

WILLIAM PARKER.

Witnesses:
L. L. BAKER,
WM. H. VIROLIS.